(12) United States Patent
Fliedner et al.

(10) Patent No.: US 8,793,120 B1
(45) Date of Patent: Jul. 29, 2014

(54) BEHAVIOR-DRIVEN MULTILINGUAL STEMMING

(75) Inventors: Gerhard Fliedner, Munich (DE); Swaminathan Sundaramurthy, Sunnyvale, CA (US); Anuradha Subramanian, Redwood City, CA (US); Daniel E. Rose, Cupertino, CA (US); Anjan Goswami, Sunnyvale, CA (US)

(73) Assignee: A9.com, Inc., Palo Alto, CA (US)

( * ) Notice: Subject to any disclaimer, the term of this patent is extended or adjusted under 35 U.S.C. 154(b) by 843 days.

(21) Appl. No.: 12/914,934

(22) Filed: Oct. 28, 2010

(51) Int. Cl.
*G06F 17/27* (2006.01)
(52) U.S. Cl.
USPC .......................................................... 704/9
(58) Field of Classification Search
USPC .......................................................... 704/9
See application file for complete search history.

(56) References Cited

U.S. PATENT DOCUMENTS

| | | | | |
|---|---|---|---|---|
| 5,412,567 A * | 5/1995 | Karttunen | ...................... | 704/10 |
| 5,684,999 A * | 11/1997 | Okamoto | .......................... | 704/9 |
| 5,704,060 A * | 12/1997 | Del Monte | ............................ | 1/1 |
| 5,754,938 A * | 5/1998 | Herz et al. | ...................... | 725/116 |
| 5,946,648 A * | 8/1999 | Halstead et al. | ................... | 704/9 |
| 6,307,548 B1 * | 10/2001 | Flinchem et al. | ............. | 715/811 |
| 6,470,307 B1 * | 10/2002 | Turney | ............................... | 704/9 |
| 6,721,734 B1 * | 4/2004 | Subasic et al. | ......................... | 1/1 |
| 6,741,959 B1 * | 5/2004 | Kaiser | .............................. | 704/7 |
| 6,820,237 B1 * | 11/2004 | Abu-Hakima et al. | ........ | 715/210 |
| 7,072,827 B1 * | 7/2006 | Carmel et al. | ..................... | 704/9 |
| 7,470,307 B2 * | 12/2008 | Larink, Jr. | ......................... | 75/345 |
| 7,647,228 B2 * | 1/2010 | Silvera et al. | .................. | 704/275 |
| 7,747,428 B1 * | 6/2010 | Karsh et al. | ........................ | 704/4 |
| 7,890,521 B1 * | 2/2011 | Grushetskyy et al. | ........ | 707/755 |
| 7,912,703 B2 * | 3/2011 | Magdalen et al. | ................ | 704/9 |
| 8,037,086 B1 | 10/2011 | Upstill et al. | | |
| 8,290,961 B2 * | 10/2012 | Chew et al. | .................... | 707/748 |
| 8,346,795 B2 * | 1/2013 | Roulland et al. | .............. | 707/766 |
| 8,473,279 B2 * | 6/2013 | Al-Shammari | ................... | 704/9 |
| 8,515,731 B1 * | 8/2013 | Ramirez Robredo et al. | .... | 704/2 |
| 2003/0055625 A1 * | 3/2003 | Korelsky et al. | .................. | 704/9 |
| 2005/0071152 A1 * | 3/2005 | Morimoto et al. | .............. | 704/10 |
| 2006/0200336 A1 * | 9/2006 | Cipollone et al. | ................ | 704/4 |
| 2009/0055380 A1 * | 2/2009 | Peng et al. | ........................ | 707/5 |

(Continued)

OTHER PUBLICATIONS

Muhamad Taufik Abdullah, Fatimah Ahmad, Ramlan Mahmod, Tengku Mohd Tengku Sembok, "A Stemming Algorithm for Malay Language", CITA 2005.*

(Continued)

*Primary Examiner* — Eric Yen
(74) *Attorney, Agent, or Firm* — Novak Druce Connolly Bove + Quigg LLP

(57) ABSTRACT

User behavior data can be used with language-specific rule sets to generate stemming databases useful for such tasks as indexing and search query processing. The terms contained in user queries, as well as user behavior with respect to those queries or results returned for those queries, can be analyzed to determine a relative measure (e.g., relative frequency) of various forms of those terms. When generating a stemming database, language-specific rule sets can be used to determine appropriate stemming rules, and where more than one potential rule is identified the user behavior data can be used to select what is likely the appropriate rule, at least for the respective environment. Whitelists or other such components can be used to handle specific or irregular forms that do not follow the general rules or otherwise are exceptions that might not otherwise be processed correctly.

24 Claims, 9 Drawing Sheets

(56) References Cited

U.S. PATENT DOCUMENTS

| | | |
|---|---|---|
| 2009/0070323 A1 | 3/2009 | Parikh et al. |
| 2010/0131900 A1* | 5/2010 | Spetalnick .................... 715/825 |
| 2012/0233140 A1 | 9/2012 | Collins-Thompson et al. |

OTHER PUBLICATIONS

USPTO, "Non-Final Office Action," corresponding U.S. Appl. No. 13/159,292, dated Dec. 19, 2012, 16 pages.

USPTO, "Final Office Action," corresponding U.S. Appl. No. 13/159,292, dated Apr. 25, 2014, 17 pages.

\* cited by examiner

| Rule name | Forms | Pattern | Examples |
|---|---|---|---|
| English noun s plural | -<br>-s | stem does not end in<br>-ch<br>-x<br>-s<br>-sh | computer, computers<br>movie, movies |
| English noun y/ies plural | -y<br>-ies | | lady, ladies |
| English noun -es plural | -<br>-es | stem ends in<br>-ch<br>-x<br>-ss<br>-sh | match, matches<br>hex, hexes |
| French adjective | -<br>-e<br>-s<br>-es | | americain, americaine, americains, americaines (American) |
| French adjective -eux | -x<br>-se<br>-ses | | hereux, heureuse, heureuses (happy) |
| French adjectiv f/ve | -f<br>-fs<br>-ve<br>-ves | | juif, juive, juifs, juives (Jewish) |
| Italian adjective | -o<br>-a<br>-i<br>-e | stem does not end in g, c | italiano, italiana, italiani, italiane (Italian) |
| Italian adjective c | -o<br>-a<br>-hi<br>-he | stem ends in c or g | greco, greca, grechi, greche (Greek) |

FIG. 4

BEHAVIOR-DRIVEN MULTILINGUAL STEMMING

BACKGROUND

As the amount of information available electronically increases, there is a corresponding need to improve the way in which users are able to locate information of interest. Various information retrieval systems, including a number of search engines, enable users to search large collections of documents, pages, files, and other such groupings of content. Such systems can enable the searching of documents on a variety of sources, such as a user's own computer, a Web site, a data repository hosted across a network, or any other such source. Such systems typically create an index of the documents by determining words or phrases contained in those documents. When a search query is subsequently received, the system can compare the keywords in the query to the words in the index to find matching documents. For example, a user might submit a query to an electronic marketplace when performing a product search, and keywords in that query can be compared to an index including information for products offered through that electronic marketplace.

In order for such a process to provide accurate results, the keywords in a query must be accurately matched with the corresponding words in the index. Such matching is not straightforward, however, as many words have different forms, and it is often the case that the user will be interested in receiving results that have other forms of a word. For example, a user searching for the word "computers" is likely also interested in documents that contain the word "computer." As these words are not exactly the same in form, there will not be an exact match. To address the variation in word forms, conventional search engines utilize a module referred to generally as a "stemmer," which replaces an inflected or surface form of a word with its root form (since most languages use inflected forms or words to indicate grammatical properties such as case or tense). Stemming generally is applied both at index time, to transform the words in the documents into the respective stemmed form, and at query time, to transform the words in a received query. Using such an approach, words in queries will generally share a canonical form with the words in the index. Stemming is especially important in highly-inflected languages such as German, which has more noun cases than English and also inflects adjectives.

In many instances, the dictionary of words that must be analyzed is ever increasing. For example, an electronic marketplace that is continually offering new products will have a continually increasing number of words that need to be indexed, such as may correspond to new product names and manufacturers. Conventional stemmers do not adequately handle this ever increasing vocabulary. For example, certain stemmers (e.g., heuristic stemmers) apply a series of rules indicating how words should be transformed. Such an approach is not optimal, however, as the interactions of these rules and various exceptions becomes increasingly complicated, particularly as additional exceptions are handled and new sets of rules are created. Other stemmers (e.g., table-driven stemmers) utilize a type of lookup table that maps inflected forms to root forms for all known words, but such an approach requires an exhaustive and authoritative list of words and their inflected forms as input. As the number of words increases, there is a corresponding need to update each table with the appropriate new vocabulary.

BRIEF DESCRIPTION OF THE DRAWINGS

Various embodiments in accordance with the present disclosure will be described with reference to the drawings, in which:

FIG. 4 illustrates an example set of rules in multiple languages that can be used in accordance with various embodiments;

DETAILED DESCRIPTION

Figure 1:
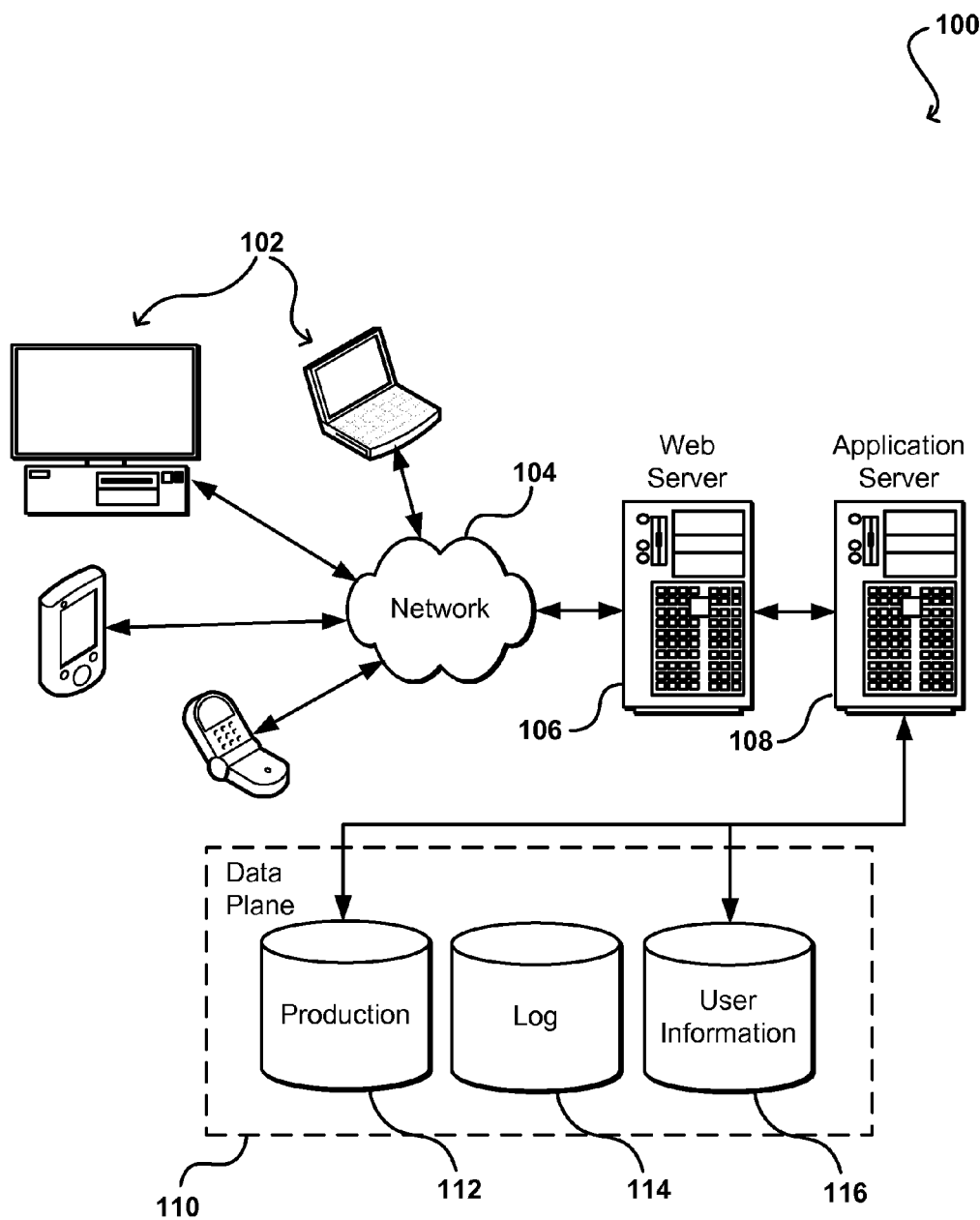
FIG. 1 illustrates an environment in which various embodiments can be implemented.

Systems and methods in accordance with various embodiments of the present disclosure may overcome one or more of the aforementioned and other deficiencies experienced in conventional approaches to stemming a plurality of words, as is useful in searching for content. In particular, various embodiments provide systems, methods, and non-transitory computer-readable storage media for generating and utilizing a stemming database that is generated based at least in part upon the behavior of a plurality of users. Various rule sets can be used for each of a plurality of languages. These rule sets can be used to assist in the creation of a stemming database, lookup table, and/or search index for each language, for example, and can be used as a fallback for new words that are not yet in the lookup table. Further, various embodiments enable all stemming rules that might apply to a word to be considered, with user behavioral data used to determine the appropriate stemming rule. Such an approach not only provides accurate results, which adapt to user behavior over time, but also avoids the need to resolve conflicts among a set of rules and exceptions.

In one embodiment, a stemming database is built by analyzing data from a plurality of user queries. For example, several search queries can be received from users of a search service, and information such as keywords and phrases can be stored to a query log or other such data store. Various other information can be stored as well, such as the actions of those users when presented with search results corresponding to those submitted user queries. These actions can include, for example, a user viewing information corresponding to a search result, selecting a link for a search result, making a purchase of an item corresponding to a search result, or any other such action. This additional information can be stored as behavioral data, or any other type of data that can be used to associate the behavior of multiple users with various items or instances of content when presented as search results for a given query term.

A component such as a stemming determination module is able to access information such as the log data, behavioral data, a search index, and/or other such information to attempt to determine the appropriate stem for various received query terms, based at least in part upon observed user behavior. For example, the module can attempt to apply rule sets for a respective language to the words in a search index. In cases where the stem for a word is clear based on a rule for that language, the stem can be associated with that word in the stemming database. In cases where the stem is not clear, or where there are several possible stems based upon different rules, the behavioral data can be utilized to attempt to select an appropriate stem. In at least some embodiments, the relative frequency of each stem being associated with a particular word can be analyzed, and the stem can be selected that is most often associated with a particular word based at least in part upon the behavioral data. In some embodiments, a whitelist also can be used that contains exceptions that cannot be, or are at least not likely to be, correctly stemmed using such a process. A whitelist can take the form of, for example, a set of <form, stem> pairs for a given language. Once an appropriate stem is determined, that stem can be added to a stemming database (if not already included) and mapped to the respective term. As should be understood, a given stem can be matched to several terms, at least some of which can be different forms of the same word.

The process of generating a stemming database can be completed for different languages (e.g., English, French, German, or Italian), geographical regions, markets, or other such groupings. In many cases the stemming information for different languages can be stored in separate data stores, but it should also be understood that in other embodiments the stemming information for multiple languages could be stored as separate portions of a common data store, stored across a distributed data system, etc. Further, the embodiments are not limited to Latin-based languages or languages with Roman characters, but can include any appropriate inflected language where stemming or other variational rules can be applied advantageously for purposes such as indexing and search.

Once generated, the stemming database can be used for any appropriate purpose. For example, in a search system the database can be used as part of the process of generating, updating, and/or supplementing a search index used to search for documents matching a query. For example, terms extracted from documents to be made available for searching can be stemmed according to the stemming database as part of the document indexing process. A stemming database can also be used to process queries subsequently received from users or other such sources, in order to process terms in the query to improve matching results. For example, a query might include a term in a particular form, such as plural or possessive, and it can be desirable to stem the word in order to find results that match other forms of the word as well, such as a singular form. The results included in a search result list then can potentially include documents including any appropriate form of the query term.

Such approaches can also be utilized advantageously for various search services and/or shared resource environments. For example, FIG. 1 illustrates an example of an environment 100 for implementing aspects in accordance with various embodiments. As will be appreciated, although a Web-based environment is used for purposes of explanation, different environments (e.g., local network or cloud-based environments) may be used, as appropriate, to implement at least portions of the various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as locating and/or serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those discussed in detail below.

As discussed above, various systems and methods in such an environment can generate, and utilize, behavior-driven stemming databases for search systems and services, as well as for other such purposes. Such a database can enable a searching system, for example, to provide users with accurate results based upon one or more keywords the user has entered into a search query. In particular, various embodiments enable the determination of the appropriate stem for words of the search query, where the appropriate stem can be determined based at least in part upon the monitored behavior of various users.

Figure 2:
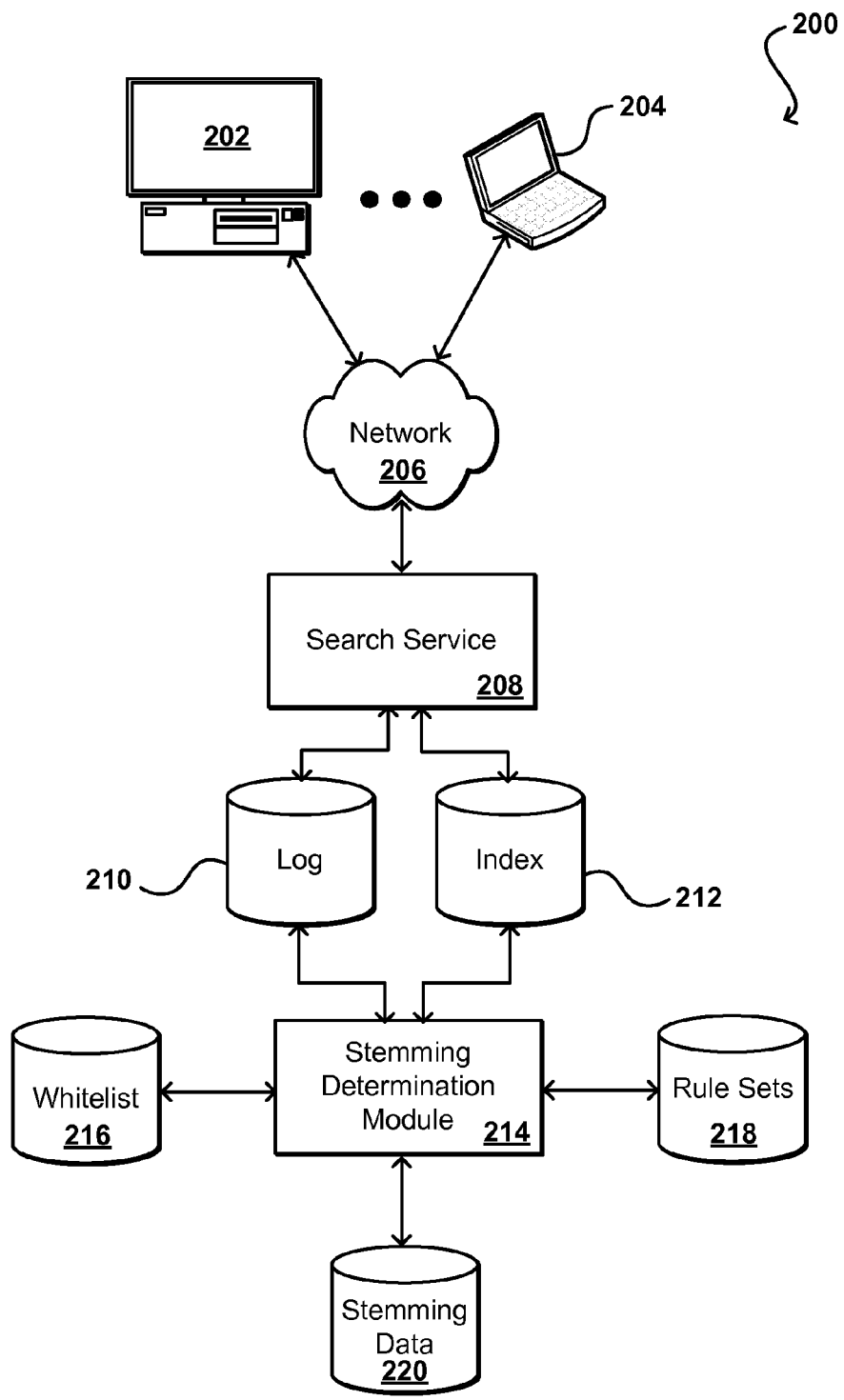
FIG. 2 illustrates an example environment in which a multilingual, behavior-based stemming database can be generated in accordance with various embodiments.

FIG. 2 illustrates an example configuration 200 of components of an environment such as that described with respect to FIG. 1 that can be used to generate a stemming database 220 in accordance with various embodiments. In this example, a number of queries can be received over at least one appropriate network 206, such as the Internet or an ethernet, to at least one search service 208 or similar component or system. It should be understood however, that other examples are possible that do not utilize such a network. The queries can be received from any appropriate user or client device 202, 204, such as a computer, smart phone, video game console, and the like. The search service can utilize at least one search index 212 to attempt to locate results that match the received queries, and provide those results back to the respective client device (or other appropriate location) in response to the query. The search service, or another system or service associated with the search service, can monitor the actions of a user with respect to the provided search results. For example, the service can track which results the user accesses, such as by clicking or otherwise selecting, as well as other actions, such as which search results resulted in a user purchase or other such transaction. Any such information (e.g., behavioral data) can be associated with the query terms that resulted in the search results, and this information (and any other appropriate information) can be stored to a log database 210 or other appropriate data store for subsequent analysis.

After a minimum amount of behavioral data has been captured, a stemming determination module 214 or other such component can attempt to utilize this and potentially other types of information to generate and/or update a stemming database 220. In at least one embodiment, the stemming determination module 214 has access to at least one rule set for a specified language, as may be generated by a human familiar with the language and selected or configured by an administrator or other appropriate source. As discussed in more detail later herein, the rule set(s) can include rules used for stemming word forms in a particular language. The stemming database also can have access to the at least one search index 212, and can attempt to stem the words in the search index(es) according to the appropriate rule set(s).

As discussed elsewhere herein, however, there can be many words in an index or dictionary that do not follow standard rules, or that may appear to have more than one applicable stemming rule. In at least one embodiment, words that are exceptions, irregular forms (e.g., "stria" and "striae"), or have very infrequently used stemming rules can be added to a whitelist 216, or other such list or grouping, whereby those words are mapped to specific stems for a language independent of the current rule set. These can also include, for example, words that do not require stemming or that do not have multiple forms. A whitelist can take precedence over the table generation process or other steps of a process utilizing the stemming database. When the stemming determination module encounters a word that is on the whitelist, the module can either ignore the word (as it is already on the whitelist) or can add the word to the stemming database 220 (depending upon whether subsequent uses utilize both the whitelist and the stemming database, or just the stemming database, for example).

In many other instances, there will be words for which multiple rules might apply. For example, one rule for English says that if a word ends in "-s," then the word can be stemmed by removing that ending. Another rule says that if a word ends in "-ies," then the word can be stemmed by removing that ending and adding "-y." Both of these rules might apply to the word "ladies," and both might apply to the word "movies." In order to determine which of the candidate rules is best for each word in the present example, the stemming determination module 214 can take advantage of the log database 210 (including any appropriate user behavior or similar data, such as selection data, click-through data, user action data, purchase data, etc.) to attempt to select the appropriate stem. For example, the log data might indicate the frequency with which users entered certain forms of a word into a search query, as well as the frequency with which users interacted with search results corresponding to a particular form of a query term. For example, users might enter "movie" more than "movies" as a query term, but both might be acceptable forms. The users might interact frequently with results that include the term "movie" for either query term, but might infrequently interact with results that include the term "movy," indicating that the word "movy" likely is not an appropriate stem or variation of either term "movie" or "movies." In cases where the frequencies of two or more forms are substantially similar, or do not differ by at least a threshold amount, the system might decide that two or more forms are likely possible, and thus might not provide a single mapping to the stemming database. If one particular stem appears with a substantially higher frequency (or other such criterion), then that stem can be mapped to the query term in the stemming database 220.

Figure 3:
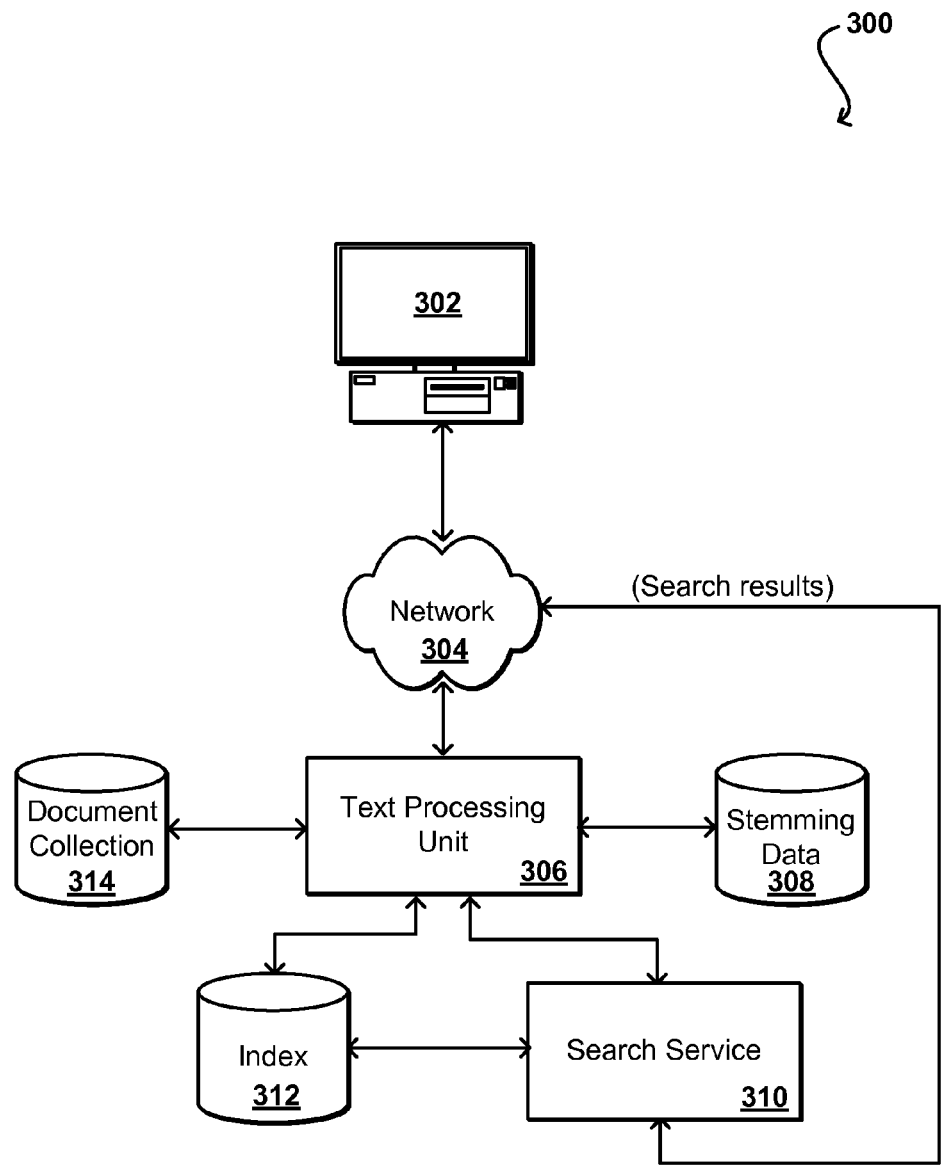
FIG. 3 illustrates an example environment in which a multilingual, behavior-based stemming database can be used for indexing and for query matching in accordance with various embodiments.

FIG. 3 illustrates an example configuration 300 of components for utilizing such a stemming database 308 in accordance with various embodiments. It should be understood that this can comprise a separate system or part of a common system with at least a portion of the components illustrated in FIG. 2. In addition, this example uses similar components to update the index 312 and process queries, but in other embodiments these functions can be at least partially performed by separate systems or services.

In this example, a component or service such as a text processing unit 306 can assist in generating and/or updating a search index 312, or other such index or grouping of words or terms. As discussed above, the amount of content in a document collection 314 can be continually increasing, with a corresponding increase in new terminology that must be processed and indexed. At certain times, such as hourly, daily, monthly, randomly, or at any other appropriate time(s), a text processing unit can crawl or otherwise process new and/or updated documents in the document collection 314 and extract terms to be used to index those documents. The text processing unit can perform any of a number of text processing procedures, such as may include tokenization, stop wording, and stemming. For example, a document might first be tokenized to break the query string into a series of tokens, each token corresponding to a sequence of characters grouped as a useful semantic unit, discarding characters such as certain punctuation, symbols, etc. Once the sentences (or other groupings of text) are tokenized, the tokens can be analyzed for stop words, in order to filter out words that might cause problems with, or otherwise negatively impact, an indexing and/or search procedure. Stop words can include, for example, "a," "an," "of," "the," and other such words as known in the art.

After the documents are tokenized and filtered for stop words, for example, the remaining tokens can be processed using a stemming procedure in accordance with various embodiments. As discussed in more detail elsewhere herein, the text processing unit 306 can lookup or reference the data in the stemming database, which as discussed above includes (or is at least based upon) user behavior-based information, such as may include mappings, stems, etc. Once the proper stems are located for the tokens, the stems can be added to the index 312 and associated with the respective document in the document collection 314.

A similar set of components can be used to provide search results in response to user queries. In FIG. 3, a query can be received from a client device 302 over a network that is intended for a search service. Although in this example the request is shown to be directed to the text processing unit before the search service, it should be understood that other flows are possible as well, such as to direct the request first to the search service, or where the text processing unit is part of the search service, etc. The query can be directed to the text processing unit 306, wherein the unit can perform at least some similar steps on the query, as may include tokenization, stop wording, and stemming. The text processing unit can utilize the stemming database 308 in order to utilize the user behavior-based information in selecting appropriate word stems. The remaining terms of the query, including processed tokens, terms, stems, or other such forms, then can be sent (or returned) to the search service 310, which can compare those forms with the information in the search index 312 to attempt to determine matching documents and provide a list of search results to provide back to the client device 302 across the network 302. For example, a query including the text "for today's ladies" might be tokenized into "for" and "today's" (or "today") and "ladies," and the "for" might be removed as a stop word, leaving "today's" and "ladies". Through stemming, the query terms can be stemmed to "today" and "lady." The term "ladies" can be stemmed properly to "lady" instead of "ladie" or another possible form according to a language rule based at least in part upon the user behavior information.

As discussed above, the proper stem to be mapped to a word in the stemming database can be determined at least in part using one or more language rules, which can be part of a rule set that is specific to the respective language, region, etc. As an example, FIG. 4 illustrates examples of rules 400 that can be used in different languages. These examples are not "linguistic" descriptions, per se, but instead examples of how stemming rules might actually be implemented in accordance with at least one embodiment. In a first example, the rule for basic English plurality is to add an "-s" to the end of the singular version of the word. As part of the pattern, however, exceptions to this rule are also illustrated, including words that end in "-ch," "-x," and other such characters. The rules for these exceptions also can be included, such as how to pluralize an English word ending in "x," etc. As can be seen, there can be different types of rule in different languages, but the basic form of the pattern can remain unchanged, which enables the same (or a similar) text processing module (or other such module or service) to apply the rules.

Figure 5A:
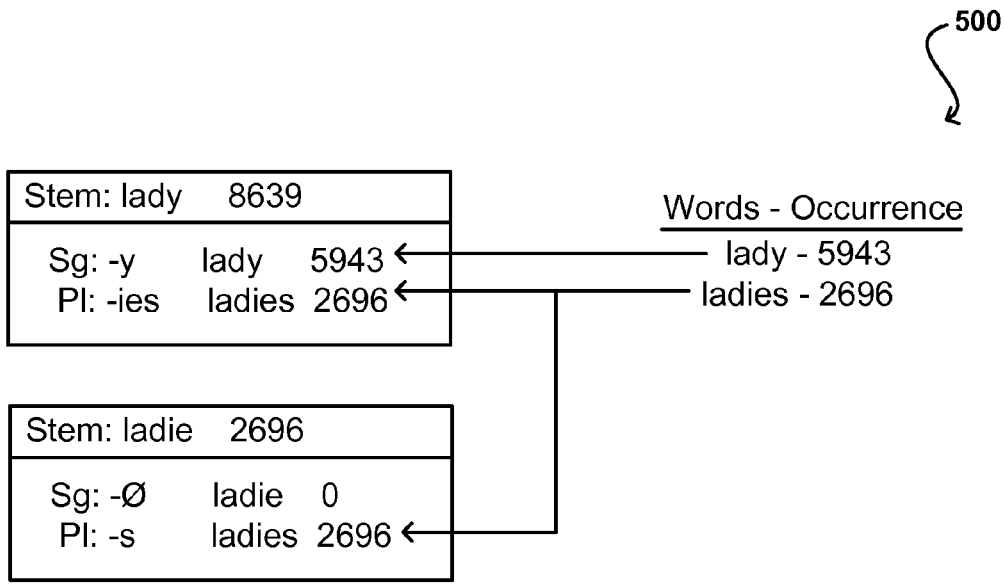
FIGS. 5(a) and 5(b) illustrate examples useful for implementing user behavior-based stemming that can be used in accordance with various embodiments.
Figure 5B:
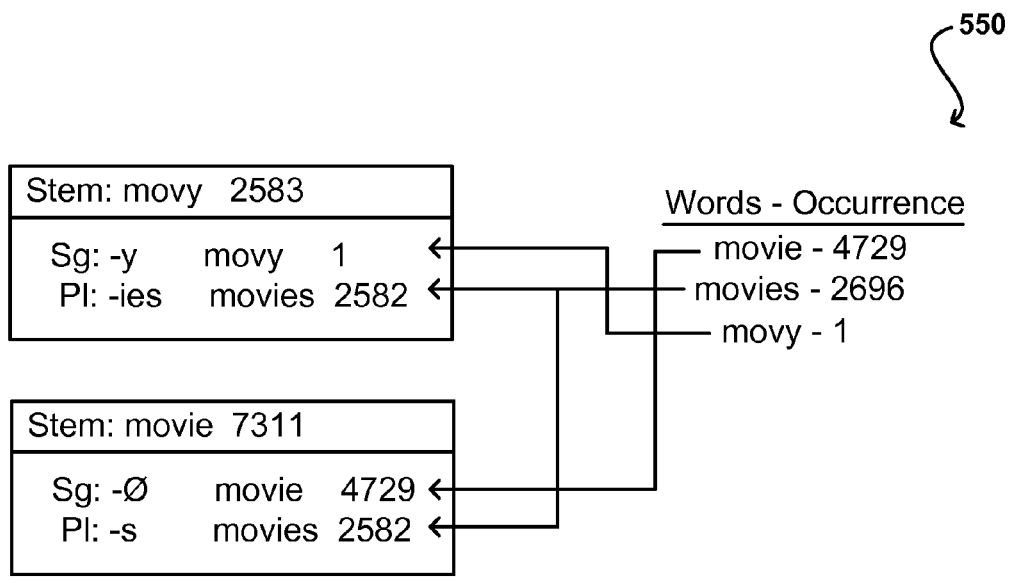

FIGS. 5(a) and 5(b) illustrate examples 500, 550 of how user behavior information can be used to apply appropriate language rules, such as those illustrated in FIG. 4. FIG. 5(a) illustrates an example of how user behavior data can be used to determine the appropriate stem of the word form "ladies". In this example, the user behavior data includes relative frequencies of two forms of the word "ladies," including the singular form "lady." In this example, one of the potential stems is the form "lady," which follows the English rule of removing "-ies" from the end of the plural word form to get to the root "lad-" and then adding a "-y". The other potential stem is "ladie," which follows the rule of simply removing the "-s" to obtain the word form's singular stem. The plural word form "ladies" in this example has an occurrence of 2696 times in search queries (or other such user actions or selections) as seen in FIG. 5(a). In this particular example, the system can be configured to select the stem with the highest frequency (or other such value) as being most likely the appropriate stem for the form "ladies." Also as illustrated, the stem "lady" has an occurrence frequency of 5943 times over a given recent period. The potential stem "ladie" is shown to have had zero occurrences over that period. Using at least this information, the system can determine based on the relative number or frequency of occurrences that the form "lady" is the correct stem for the word "ladies."

The example of FIG. 5(b) illustrates how using information such as the number of occurrences of, or actions with respect to, a form over a given period can be used to determine the appropriate stem for the plural word form "movies." Using general rules for the English language, the stem could be equally likely to be either "movy" (removing "-ies" and adding a "-y" to obtain a singular form of the word) or "movie" (simply removing the "-s" from the end of the word). In this example, the system determines that the term "movies" occurs 2582 times. The system also determines that the term "movy" only occurs once, while the term "movie" occurs 4729 times. Using at least this information, the system can determine that the appropriate stem for the plural form "movies" is most likely "movie" and not "movy," since the frequency of the occurrence of "movie" is substantially higher. In at least one embodiment, the frequencies or occurrence values for each combination of term and potential stem can be added together, and the summed values for each combination can be sorted to select the most likely combination(s). For example, is this case the combination of "movies" and "movie" would have a summed value of 7,311 while the summed value for the combination of "movies" and "movy" would only be 2,583. By sorting these values, it can be apparent that the combination of "movies" and "movie" occurs much more frequently, and thus "movie" can be selected as the appropriate stem for "movies." If the summed scores of two or more combinations are similar, such as within a given percentage or amount of each other, the system might select more than one of the combinations as likely or possible stems.

As should be apparent, similar approaches can be used to implement rules in other languages as well. Further, it should be understood that different systems might select different stems for specific words. For example, if the system indexes documents about construction then the appropriate stem for the word "windows" might be "window," based upon user behavior. If, instead, the system indexes computer equipment, the appropriate stem for the word "Windows" might be the form "windows" itself, which can correspond to the Windows® operating system or another such software product. The ability to utilize user behavior on the relevant system ensures that the proper stem of the word is selected for the relevant context.

Similar approaches can be used for other words as well. For example, searches of proper names, such as when searching for authors, generally should not be stemmed. In the case that a user is searching for an author whose name is "Andreas," for example, it would not be accurate for the system to select and apply the simple English stemming rule to remove the "-s," such as where "Andreas" might be construed to be a plural form of a word. Such an approach could return search results that are populated with authors having the name of "Andrea," which would not likely include the results for which the user was searching. When entering proper nouns such as names in search engine queries, users typically do not enter capital letters such that the search engine will often not have that cue regarding a term being a name, etc. However, using an embodiment as described, the system could use user behavior and/or other such information to determine that "Andreas" should not be mapped to "Andrea" in the stemming database, and thus provide users with more accurate search results. In some embodiments, the name "Andreas" might even be whitelisted to prevent that word from being stemmed using a language-specific rule, etc.

Figure 6:
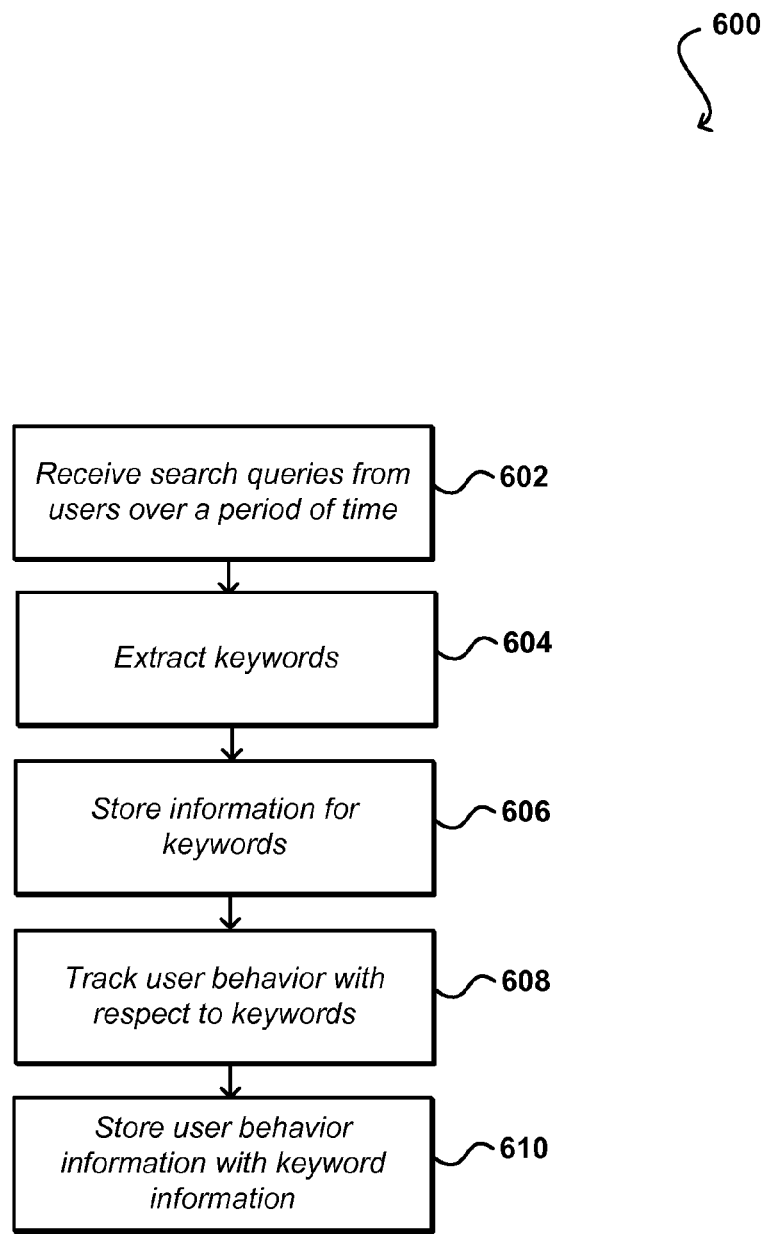
FIG. 6 illustrates an example process for gathering user behavioral data that can be used in accordance with at least one embodiment.

In order to provide a concise overview of a particular embodiment, FIGS. 6-9 illustrate portions of an example process for gathering and analyzing behavioral data. At a first portion 600 of the process as illustrated in FIG. 6, search queries are received from several users over a period of time 602. These queries are analyzed and appropriate keywords extracted 604. Information for the keywords can be stored to an appropriate data store 606, such as a log database storing user behavioral information. In some embodiments the log can store one record for each occurrence of a given keyword, while in other embodiments the log can store an updated count of the number of occurrences of a given keyword over a particular period of time. In at least some systems, additional information can be captured and/or analyzed to reflect user behavior. For example, the system can track the search results that are returned to users in response to the submitted search queries, as well as the actions of users receiving those results 608. For example, the system might track which results the user viewed, selected, moused over, or otherwise interacted with as being indicative of an association or correlation of a query term and one or more terms for the search result. Various other user behaviors can be recorded as well, such as which search results resulted in a user making a purchase, following an advertisement, submitting a subsequent query, or visiting a particular site. Similarly, the system can capture other information as well, such as which results the user did not view or interact with, as being potentially indicative of words or results that should not be associated, etc. Information captured about user behavior can also be stored to the log database 610, or another appropriate location. In some embodiments, different processes or systems can be used to capture at least a portion of the user behavior. For example, a separate service might track which results the user views and store this information in a click-through log or other such data store.

In one embodiment, data is captured for hundreds or thousands of users, with hundreds or thousands of user actions or behaviors being captured. Either as part of storing the data, or after storing the data and upon subsequent analysis, the data can be aggregated and statistically analyzed according to any appropriate statistical aggregation process.

Figure 7:
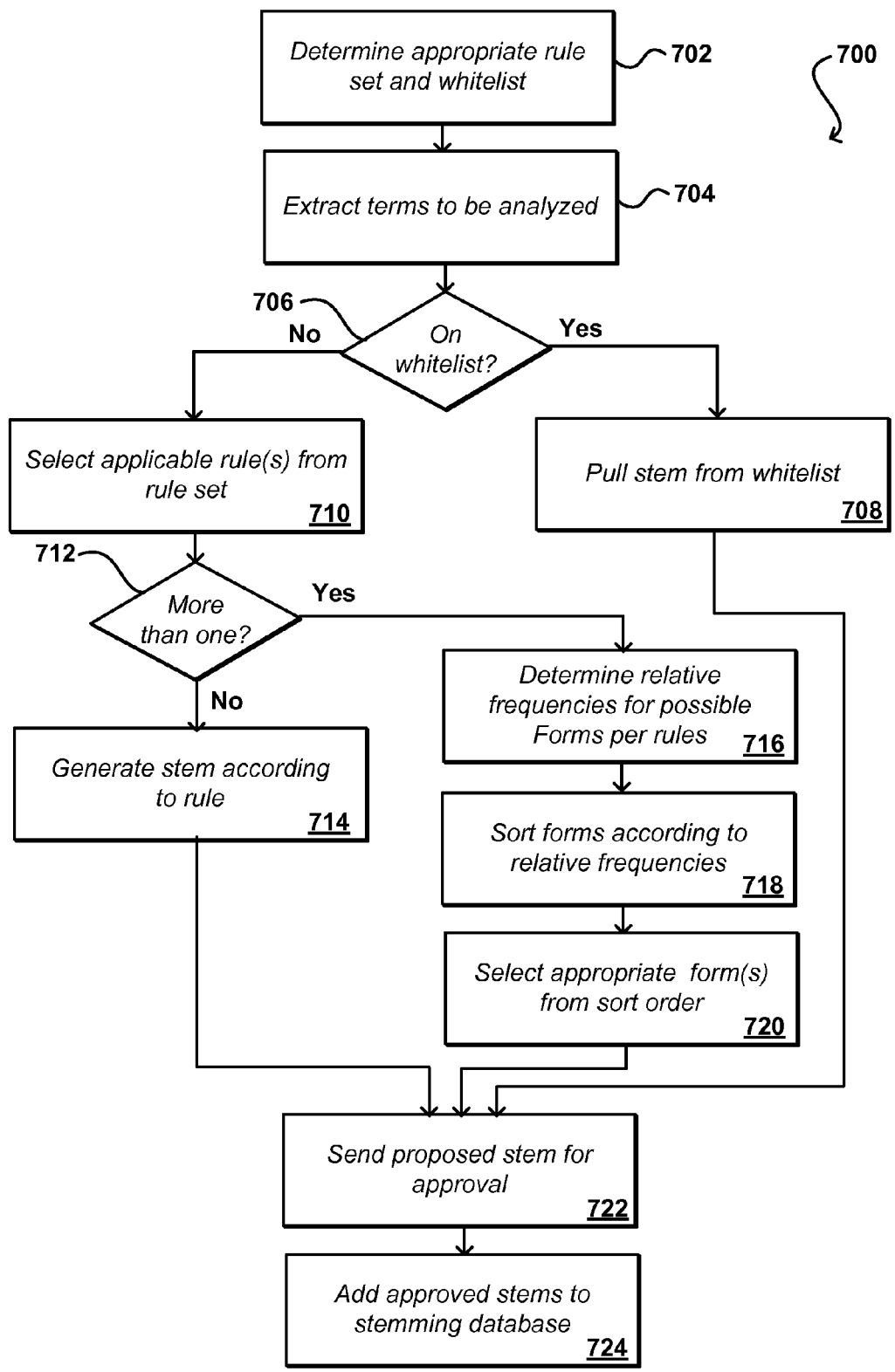
FIG. 7 illustrates an example process for building a behavior-driven stemming database in accordance with at least one embodiment.

FIG. 7 illustrates a portion 700 of the example process for building a stemming database. It should be understood that, along with the other processes described herein, various additional, alternative, or fewer steps can be performed in similar or alternative orders, or in parallel, in accordance with the various embodiments unless otherwise stated. In this example, an appropriate rule set and whitelist are determined for the current application or environment in the appropriate language 702. The rule set and whitelist can be generated or obtained using any appropriate process discussed or suggested elsewhere herein. A component such as a stemming determination module then can extract each appropriate term to be analyzed from an appropriate source 704, such as a query term database, search index, user behavior log, etc. For each term, a determination can be made as to whether that term is on the whitelist 706, and if so the appropriate stem can be selected from the whitelist 708. If the term is not on the whitelist, the rule set can be analyzed to select one or more rules that might apply to the given term 710. If only one rule applies 712, that rule can be applied and the stem generated according to the rule 714. If more than one rule applies, a determination of the relative occurrence or frequency of the form for each rule can be determined from the user behavior data 716. As discussed, in some embodiments the occurrence value for each form can be added to the occurrence value for the term being analyzed to generate a combination score. The values for the various forms then can be used to sort the forms 718, and the most likely form(s) for the stem selected based at least in part upon the sort order 720. As discussed, the number of forms selected can vary between embodiments, and can be determined based at least in part upon the differences between the sorted values.

Once at least one appropriate stem in generated, a list of pending updates can, in some embodiments, be submitted to at least one human judge or other such entity for approval 722. Each approved term can be added to a stemming database in the respective language 724. The judge can take any appropriate action where a suggestion is not correct, such as to adjust a rule or manually set the stem. In some cases, the judge might add the term to the whitelist or perform another such action. It should be understood, however, that in other cases terms can be added to a stemming database without using a human judge or similar entity to review and/or approve those terms. As discussed elsewhere herein, in some embodiments words following general rules (such as to remove the "-s" for English plurals) might not be added to the stemming database in order to save space, as these cases can be picked up later according to the general rule. Various other approaches can be used as well within the scope of the various embodiments.

Figure 8:
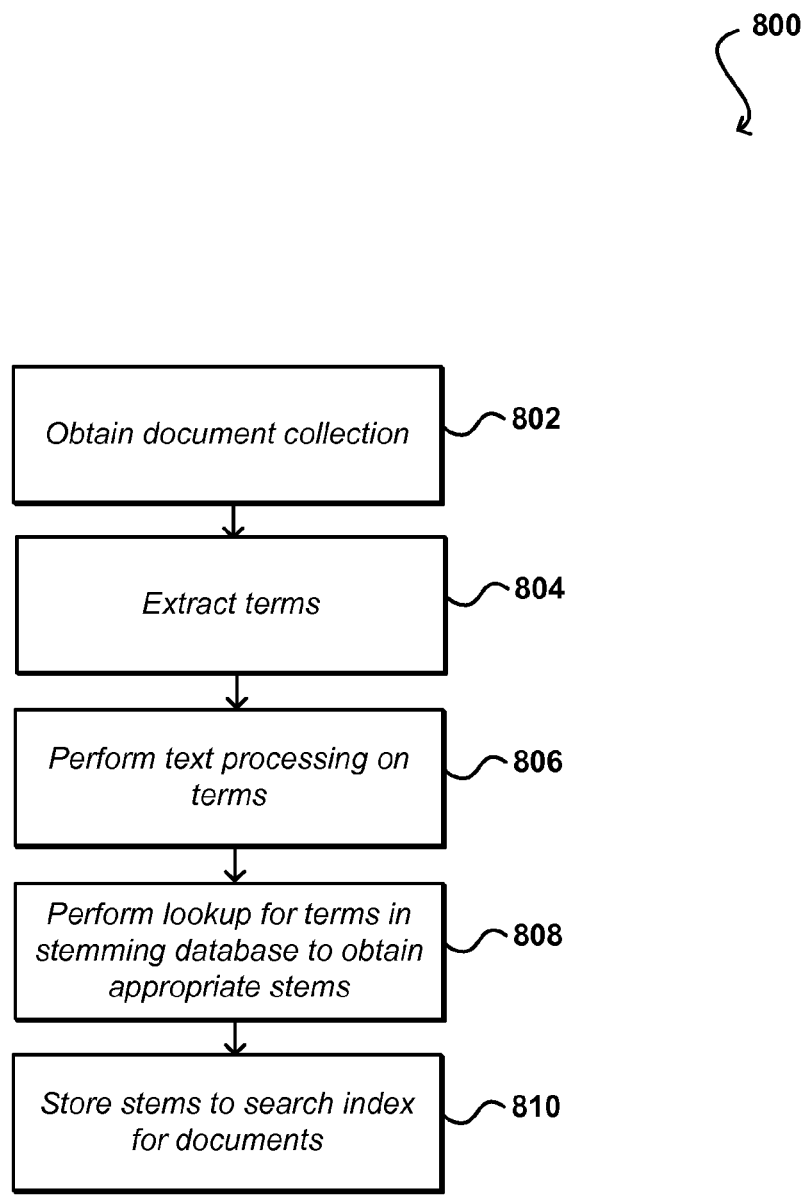
FIG. 8 illustrates an example process for using a behavior-driven stemming database to generate a search index in accordance with at least one embodiment.

Once at least one stemming database is generated for an appropriate language using user behavior data in an offline process, that database can be used for a variety of purposes. For example, FIG. 8 illustrates a portion 800 of the example process wherein a stemming database is used to generate and/or update a search index. In this example, a current version of a document collection is obtained 802, and the terms from at least a portion of the documents in the collection are extracted 804 to attempt to find terms for each document to be added to the index to allow that document to be matched with terms in a search query. The terms of the documents can be subjected to text processing 806, such as to tokenize the terms and remove any noise or stop words, etc. A lookup can be performed for the processed terms in the stemming database to attempt to obtain appropriate stems 808. As discussed elsewhere, additional elements such as whitelists and rule sets can be used to stem document terms along with a stemming database in various embodiments. After any stemming, the remaining terms for each document can be added to a search index 810 to enable that document to be matched to any received query terms, keywords, etc.

Figure 9:
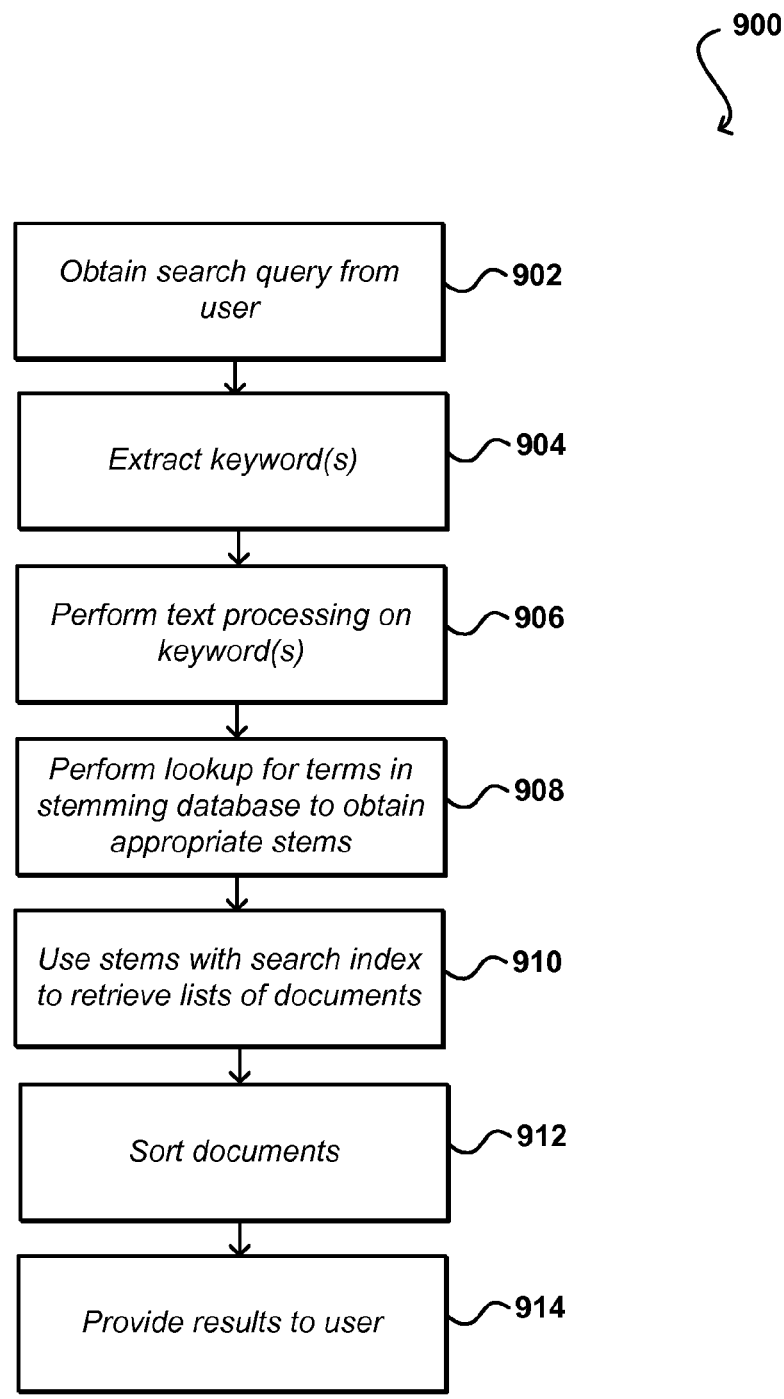
FIG. 9 illustrates an example process for using a behavior-driven stemming database to process a query that can be used in accordance with various embodiments.

A stemming database also can be used to process terms or keywords of a received search query or other such request. FIG. 9 illustrates a portion 900 of the example process wherein query terms can be processed using the stemming database and other components, such as an index generated according to the process of FIG. 8. In this example, a search query is received from a user 902, and terms or keywords are extracted from the query 904. The terms of the documents can be subjected to text processing 906, such as to tokenize the terms and remove any noise or stop words as discussed above. A lookup can be performed for the processed terms in the stemming database to attempt to obtain appropriate stems 908. As with the index building process, additional elements such as whitelists and rule sets can be used as well in various embodiments. After any stemming, the remaining terms for the query can be compared to a search index 910 to retrieve lists of documents containing the stems. The located documents can be sorted based at least in part upon the stemmed terms, user behavior information, or any other such data as appropriate 912, and returned to the user as a list of search results 914. As discussed above, the query terms and subsequent behavior of the user can be captured as discussed with respect to FIG. 7.

In at least some embodiments, a dictionary, document collection, or other such source of information can be incorporated into, or associated with, a search engine or search service, while in other embodiments those sources can be created, stored, and/or maintained separately, such as part of a separate service that can be used with a search engine. In addition to terms corresponding to primary content, a dictionary may also include terms corresponding to supplemental content, such as advertising or third party content. The ability to stem information for advertising and/or supplemental content can also help to ensure that appropriate content is delivered to the user with search results or other such content.

In some embodiments, separate instances of a text processing unit can be used for different portions of the process. For example, when creating an index using a stemming database a first instance of a text processing unit can be utilized that executes on the servers responsible for creating the index. When processing user queries, however, a second instance of a text processing unit can be utilized that executes on the other servers, such as search servers. In at least some embodiments, an instance or replica of one or more stemming databases can be present on each respective server, which can include databases for several languages (e.g., up to 10 or more) in memory, even on the search servers.

In order to properly support stemming for different regions and languages, such as for an electronic marketplace offering items for consumption in multiple locations, multiple stemming databases can be used, such as one per language. As discussed, each database can be used to generate a respective index as well as to process search queries, or there can be one instance of each database used for the indexing process and another instance of each stemming database used for query processing. In at least some embodiments, a database lookup is executed for each token (at both the indexing and query processing stages), and if no matching database entry is found, one or more heuristic rules can be applied, such as to strip the "-s" at the end of an English word. If such general patterns exist in a language that can be captured using such a purely heuristic approach, certain embodiments might determine not to include forms for these patterns in the stemming database as such an approach can save space and simple heuristic rules can be used to handle these cases. In cases where search servers run searches in multiple live sites, or multiple instances of the same site in different languages, there might be several databases resident on a given machine.

As discussed above, various embodiments utilize language-specific rule sets (e.g., inflection tables) with a database generation process to build a stemming database. To allow efficient processing of these input sets, the generation process can be run on a server cluster or other set of devices in a parallelized fashion. A parallelized approach enables frequent (e.g., daily) generating and/or updating of stemming databases, even for massive amounts of data (such as is available across the Internet), where such frequent updates are needed or at least advantageous. In at least some embodiments, it is straightforward to parallelize this task; for example, one can group all words starting with the same letter(s) together or utilize another approach that ensures all possible forms of the same word are processed together.

The rule sets themselves are, in at least some embodiments, developed at least in part using the intervention of a human editor who is familiar with the respective language and can determine the appropriate rules needed to appropriately describe the language. Once these rules are defined, a stemming database generation process no longer needs a native speaker of the language to be involved; in fact, the system can run without any further human intervention. In some embodiments, the rule sets are similar to inflection tables used in grammar books. The rule sets in at least some embodiments can be used to generate, using query logs or other such information, hypothetical groupings of words. There can be cases (and in fact, for languages such as German, this is the rule rather than the exception) where (based on the input from the query logs and the rule set) there can be different possible hypotheses. A number of filters can be applied, such as to filter out words that are rarely encountered that are likely to be based on typographical errors or other such occurrences, or at least are not extremely relevant. In cases where the relative frequencies or occurrences of words in a group do not fall into a "normal" pattern, those hypotheses can be discarded. A "normal" pattern can be determined using any appropriate process, such as by using experimentation for a given language for a specific use case. For example, plural forms are generally encountered less often than singular forms. If a word such as "Andreas" is encountered with similar frequency to a word such as "Andrea" then the system can determine that Andreas is likely not a plural form of Andrea, but instead a different word.

As discussed above, the generation process can be repeated at various times in order to update the stemming database such that the database always reflects the words and language currently being used, particularly in an environment where the dictionary is continually expanding. In the case of an electronic marketplace, for example, the building and/or updating of stemming database can occur regularly in order to keep up with new items, lines of products, content providers, etc. In some embodiments, a completely new database can be built each time in order to ensure that data that is no longer needed or relevant (e.g., for products that are no longer available) are no longer taking up space in the database. In other embodiments, the database is updated incrementally, with newer versions keeping prior entries and including newly encountered information, updated mappings, etc. In some embodiments, the data can have an associated time, decay value, or other such indicator such that if no occurrences of a word or form are received or encountered for a period of time, then information for that word or form can be removed from the database. Various other approaches to optimizing a given stemming database can be used as well within the scope of the various embodiments.

In some embodiments as discussed above, a human judge or other such person can be tasked with evaluating the incremental changes in the database before those changes are applied. For example, a database generation process can analyze new query or log data and suggest a new set of entries for the stemming database. The judge then can be tasked with evaluating the suggested entries and approving or rejecting each suggestion in order to provide an improved level of accuracy. Such an approach can be beneficial as an automated suggestion process can occasionally make mistakes that a human judge or annotator who knows the language will catch before that mistake is applied.

In some embodiments, certain types of words may be excluded from a stemming process. For example, in an electronic marketplace where the search system is generally looking for product or item information, noun and adjective inflection may be of interest for stemming while words such as verbs may rarely be submitted and thus not of significant worth in stemming. The rules for such an environment thus can be selected to only reflect or describe noun and adjective inflection. In other environments or for other applications, however, it might be beneficial and/or necessary to also use derivational stemming. For example, full-text searches might include potentially any type of word in a given language. Thus, it can be desirable to include rules that find the stem "bake" for "baker" and the stem "hair" for "hairy." A process can support this additional functionality in at least some embodiments by adding rules that reflect these derivational properties. A similar process can be used to generate a stemming database that includes stems according to derivational stemming.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of stemming terms using behavioral data, comprising:
    under control of one or more computer systems configured with executable instructions,
        capturing behavioral data for a plurality of users with respect to a plurality of terms;
        obtaining a rule set for stemming in a language, the language including the plurality of terms;
        obtaining a word to be stemmed;
        in response to determining that only one rule of the rule set is to be used to stem the obtained word, stemming the obtained word using only one rule; or
        in response to determining that more than one rule of the rule set is to be used to stem the obtained word:
            determining a set of forms of the obtained word;
            determining an output set of forms corresponding to the set of forms, wherein each rule of the more than one rule corresponds to one of the forms in the output set of forms,
            determining, based at least in part upon the captured behavioral data, a relative measurement value of each form in the output set of forms, wherein each of the relative measurement values corresponds to an indication of a frequency of use of a corresponding one of the forms in the output set of forms, and
            selecting, based at least in part upon the relative measurement values, at least one form in the output set of forms to be used as a stem for the obtained word.

2. The computer-implemented method of claim 1, wherein the word to be stemmed is obtained from a data store storing the behavioral data.

3. The computer-implemented method of claim 1, wherein the stem for the word is stored to a language-specific stemming database.

4. The computer-implemented method of claim 1, further comprising:
    generating a whitelist for a plurality of words not having an appropriate rule in the rule set.

5. The computer-implemented method of claim 1, wherein the plurality of terms correspond to search terms contained in search queries submitted by the users.

6. The computer-implemented method of claim 1, wherein each of the relative measurement values corresponds to an indication of a frequency of use of one of the forms in the output set.

7. The computer-implemented method of claim 6, further comprising:
    filtering out forms having a frequency that does not at least meet a minimum frequency threshold.

8. The computer-implemented method of claim 1, further comprising:
    processing the obtained word by at least one of tokenizing or stop wording the obtained word, before determining that one or more rules are used to stem the rule.

9. A system for stemming terms using behavioral data, comprising:
    a processor; and
    a memory device including instructions that, when executed by the processor, cause the system to:
        capture behavioral data for a plurality of users with respect to a plurality of terms;
        obtain a rule set for stemming in a language, the language including the plurality of terms;
        obtain a word to be stemmed;
        in response to determining that only one rule of the rule set is to be used to stem the obtained word, stemming the obtained word using only one rule; or
        in response to determining that more than one rule of the rule set is to be used in stemming the obtained word:
            determine a set of forms of the obtained word;
            determine an output set of forms corresponding to the set of forms, wherein each rule of the more than one rule corresponds to one of the forms in the output set of forms, determine, based at least in part upon the captured behavioral data, a relative measurement value of each form in the set of output forms, and select, based at least in part upon the relative measurement values, at least one form in the output set of forms to be used as a stem for the obtained word.

10. The system of claim 9, wherein the word to be stemmed is obtained from a data store storing the behavioral data.

11. The system of claim 9, wherein the stem for the word is stored to a language-specific stemming database.

12. The system of claim 9, wherein the plurality of terms correspond to search terms contained in search queries submitted by the users.

13. The system of claim 9, wherein each of the relative measurement values corresponds to an indication of a frequency of use of one of the forms in the output set based on the captured behavioral data.

14. The system of claim 9, wherein the memory device further cause the system to generate a whitelist for a plurality of words not having an appropriate rule in the rule set.

15. The system of claim 9, wherein the memory device further cause the system to filter out forms having a frequency that does not at least meet a minimum frequency threshold.

16. The system of claim 9, wherein the memory device further cause the system to process the obtained word before determining the rule by at least one of tokenizing or stop wording the obtained word.

17. A non-transitory computer-readable storage medium including instructions that, when executed by at least one processor, cause the at least one processor to:

capture behavioral data for a plurality of users with respect to a plurality of terms;

obtain a rule set for stemming in a language corresponding to the plurality of terms;

obtain a word to be stemmed;

in response to determining that only one rule of the rule set is to be used to stem the obtained word, stemming the obtained word using only one rule; or in response to determining that more than one rule of the rule set is to be used in stemming the obtained word:

determine a set of forms of the obtained word;

determine an output set of forms corresponding to the set of forms, wherein each rule of the more than one rule corresponds to one of the forms in the output set of forms, determine, based at least in part upon the captured behavioral data, a relative measurement value of each form in the set of output forms, and select, based at least in part upon the relative measurement values, at least one form in the output set of forms to be used as a stem for the obtained word.

18. The non-transitory computer-readable storage medium of claim 17, wherein the word to be stemmed is obtained from a data store storing the behavioral data.

19. The non-transitory computer-readable storage medium of claim 17, wherein the plurality of terms correspond to search terms contained in search queries submitted by the users.

20. The non-transitory computer-readable storage medium of claim 17, wherein each of the relative measure values corresponds to an indication of a frequency of use of one of the forms in the output set based in part on the captured behavioral data.

21. The non-transitory computer-readable storage medium of claim 17, wherein the stem for the word is stored to a language-specific stemming database.

22. The non-transitory computer-readable storage medium of claim 17, further cause the at least one processor to generate a whitelist for a plurality of words not having an appropriate rule in the rule set.

23. The non-transitory computer-readable storage medium of claim 17, further cause the at least one processor to filter out forms having a frequency that does not at least meet a minimum frequency threshold.

24. The non-transitory computer-readable storage medium of claim 17, further cause the at least one processor to process the obtained word before determining the rule by at least one of tokenizing or stop wording the obtained word.

* * * * *